US006506044B1

(12) United States Patent
Francesco

(10) Patent No.: US 6,506,044 B1
(45) Date of Patent: Jan. 14, 2003

(54) PRESS WITH MOLDING EQUIPMENT

(75) Inventor: Salpietro Francesco, Padua (IT)

(73) Assignee: Wintech S.R.L., Padua (IT)

( * ) Notice: Subject to any disclaimer, the term of this patent is extended or adjusted under 35 U.S.C. 154(b) by 114 days.

(21) Appl. No.: 09/603,925

(22) Filed: Jun. 27, 2000

(30) Foreign Application Priority Data

Jun. 30, 1999 (IT) .......................................... MI99A1439

(51) Int. Cl.⁷ .............................................. B29C 33/24
(52) U.S. Cl. ................................. 425/450.1; 425/451.9
(58) Field of Search ...................... 425/34.1, 47, 450.1, 425/451.9

(56) References Cited

U.S. PATENT DOCUMENTS 2,848,771 A * 8/1958 Eggenberger ............... 425/595
3,156,014 A * 11/1964 Wenger ...................... 425/595
3,579,742 A * 5/1971 Muttart ....................... 425/595
5,091,124 A * 2/1992 Zakich ........................ 425/589
5,102,319 A * 4/1992 Hamilton et al. ........... 425/34.1
5,196,150 A * 3/1993 Mimura et al. ............. 425/595

* cited by examiner

Primary Examiner—James P. Mackey
(74) Attorney, Agent, or Firm—Young & Thompson

(57) ABSTRACT

The press includes a fixed support holding two or more first half molds set side by side; a mobile support capable of approaching and spreading apart from the fixed support and holding two or more second half molds set side by side; at least one power cylinder interposed between every first half mold and the fixed support, which allows to fine-tune the closing of the molds, thus compensating for any differences in the height of the two molds; and a plurality of devices impeding the reverse motion of the mobile support during the closing of the molds.

3 Claims, 6 Drawing Sheets

PRESS WITH MOLDING EQUIPMENT

FIELD OF THE INVENTION

The object of this invention is a press with molding equipment, designed in particular for the molding of material with a powerful expanding action, such as ethyl-vinylacetate EVA).

As known, the EVA molding process involves injecting the material at a relatively low temperature, typically at about 120° C. into heated molds, typically at about 180° C.

The material injected into the molds therefore gradually increases its temperature until it reaches the reaction temperature of the expanding agent, typically at about 150° C.

The increase in volume of the molded material under the action of the expanding material is impeded as long as the mold is kept closed, and occurs only when the mold is opened. In order to obtain an optimum product, it is necessary that the mold be capable of effectively opposing the opening force exerted by the expanding action of the molded material.

BACKGROUND OF THE INVENTION

It is also important that the opening of the mold occur as quickly as possible, so as to allow the previously injected material to expand as freely as possible; if the opening occurs slowly, the material expands within the still partially closed mold, thus leading to a deformation of the resulting finished product.

In order to boost the productive capacity of the plant, the presses need to be fitted with a molding equipment capable of holding a pair of molds set side by side.

However, the solutions already known exhibit a number of drawbacks; in order to allow the proper closing of the press, for instance, the height of the two molds must be exactly the same.

SUMMARY OF THE INVENTION

The main purpose of this invention is to offer a press capable of overcoming the drawbacks of the known art, and in particular of allowing the use of molds of different heights. Another purpose of this invention is to propose a technically simple and efficient solution to achieve a press with a molding equipment, capable of allowing the quick and simultaneous opening of both molds.

These objectives are achieved by a press with a molding equipment as described hereinafter.

BRIEF DESCRIPTION OF THE DRAWINGS

One possible embodiment of the invention will now be described, for purely exemplifying purposes, with reference to the enclosed figures, in which.

DETAILED DESCRIPTION OF THE INVENTION

Figure 1:
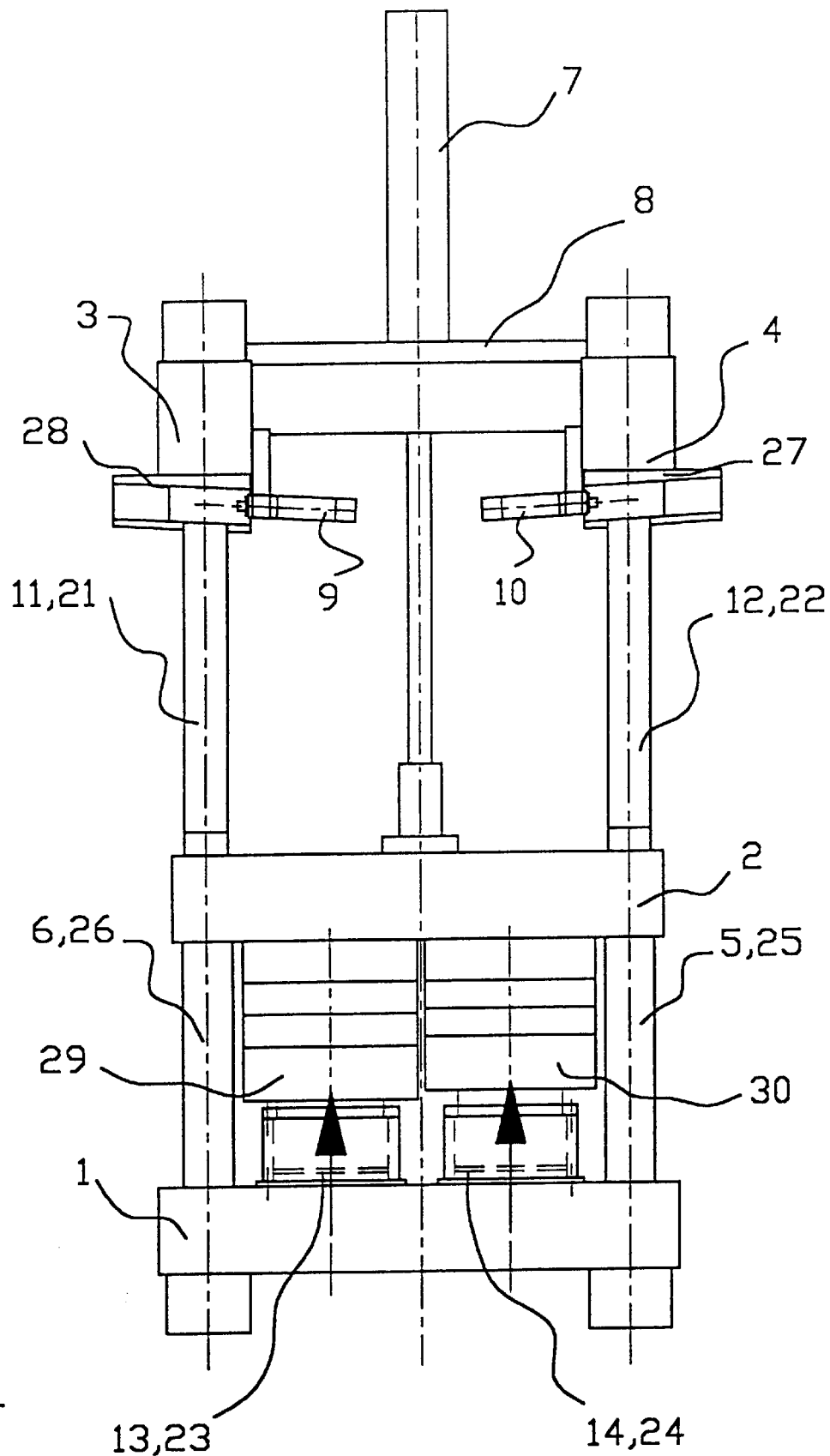
FIG. 1 represents the front view of a press with a molding equipment, capable of holding two molds, in a first operating position.
Figure 2:
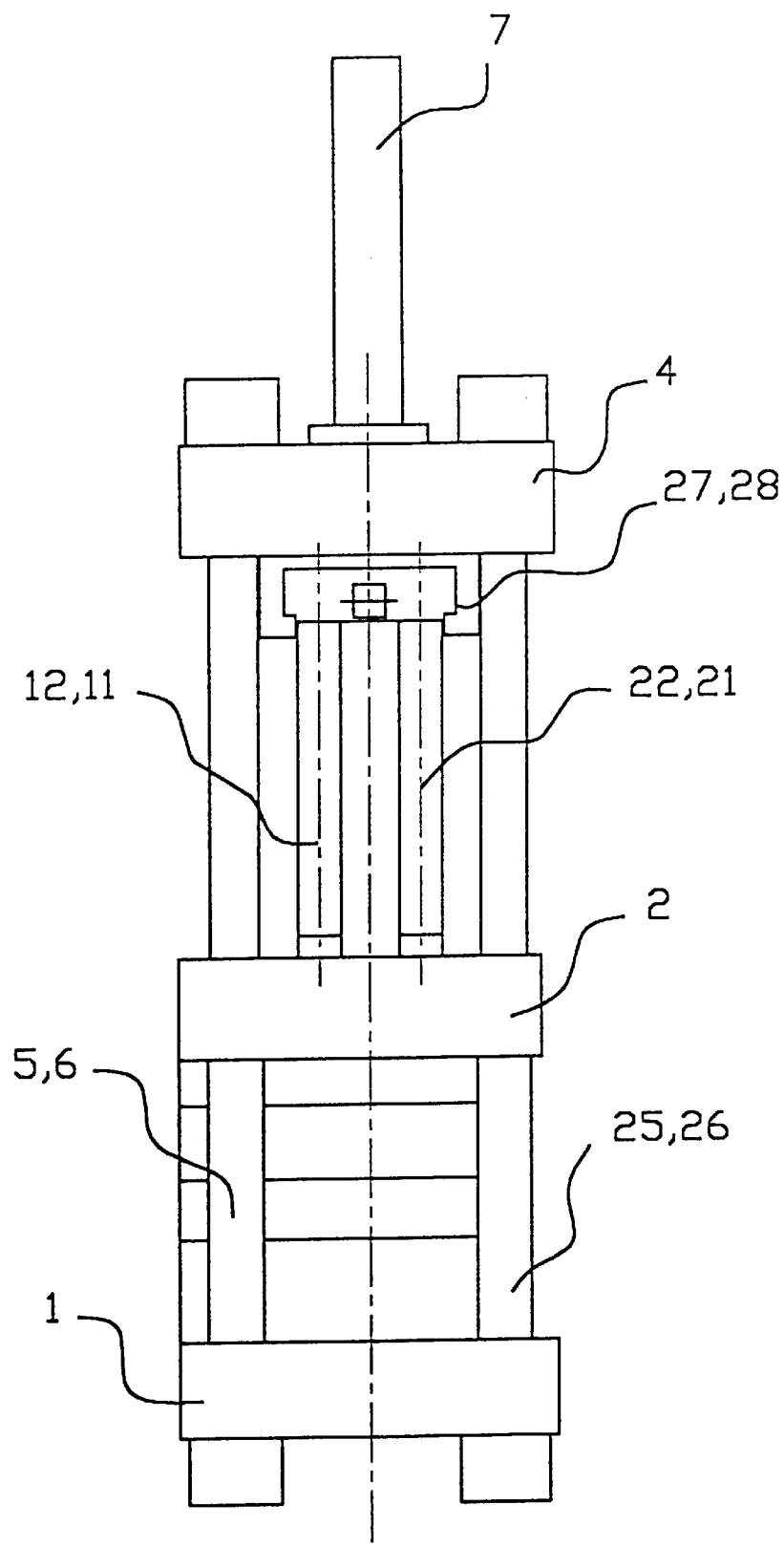
FIG. 2 is a side view of the same press shown in FIG. 1.
Figure 3:
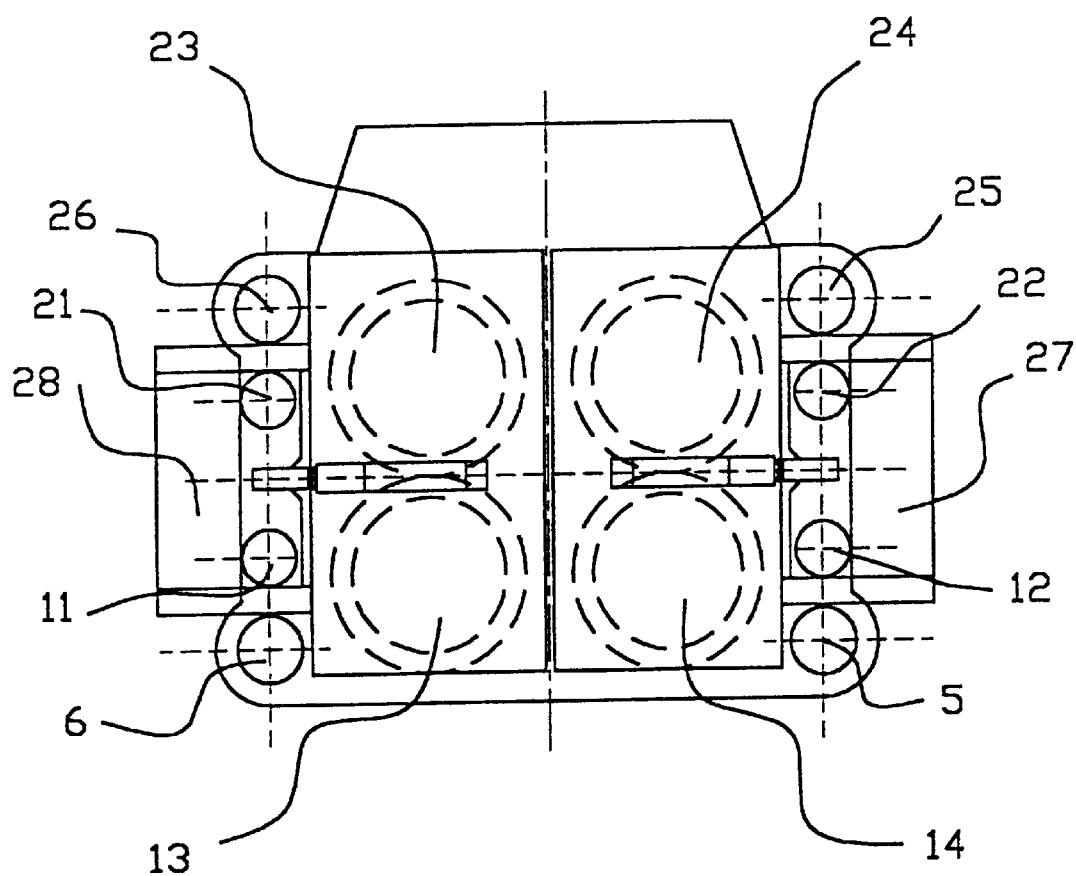
FIG. 3 is a ground view of the same press shown in FIG. 1.
Figure 4:
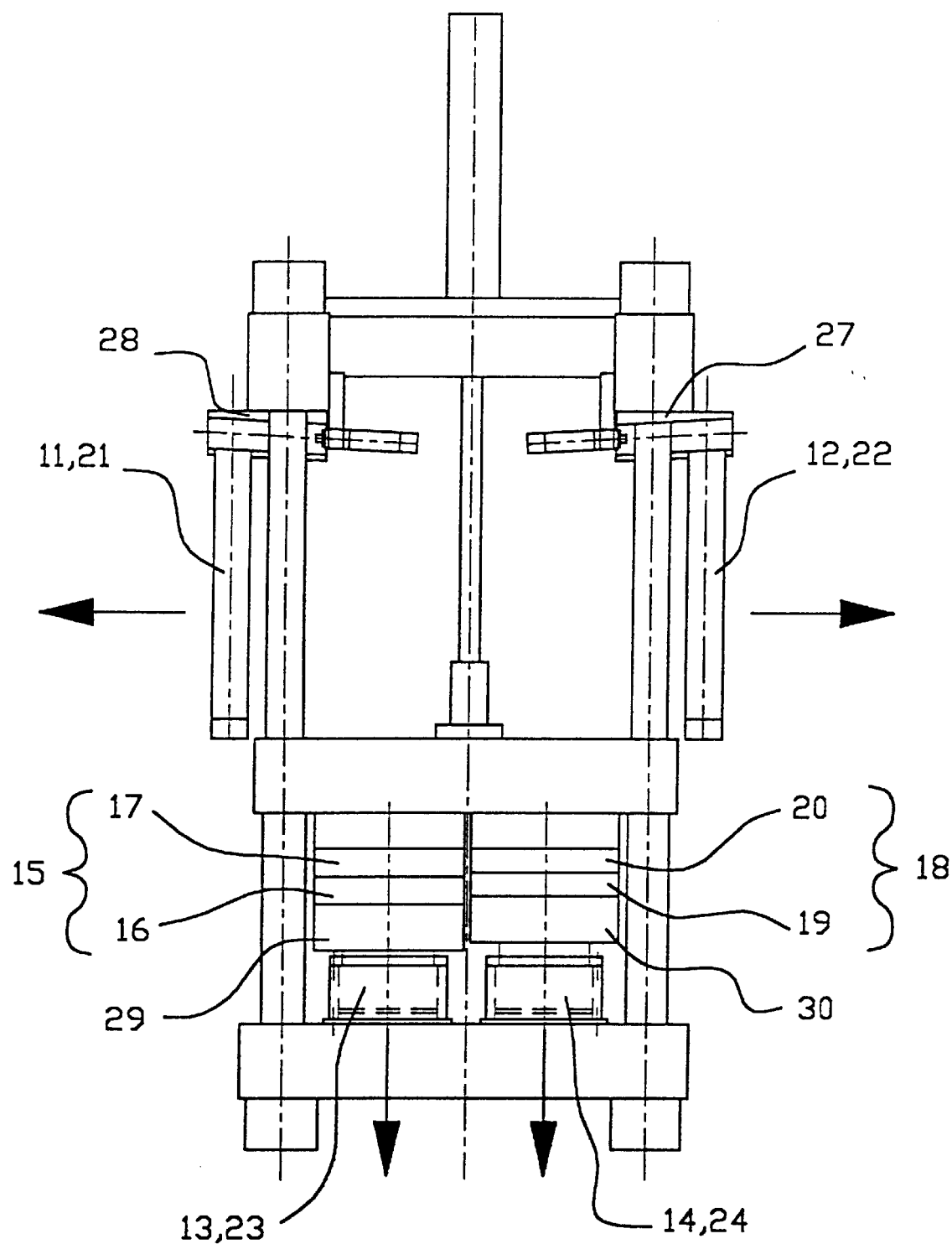
FIG. 4 is a front view of the press shown in FIG. 1, in a second operating position.
Figure 5:
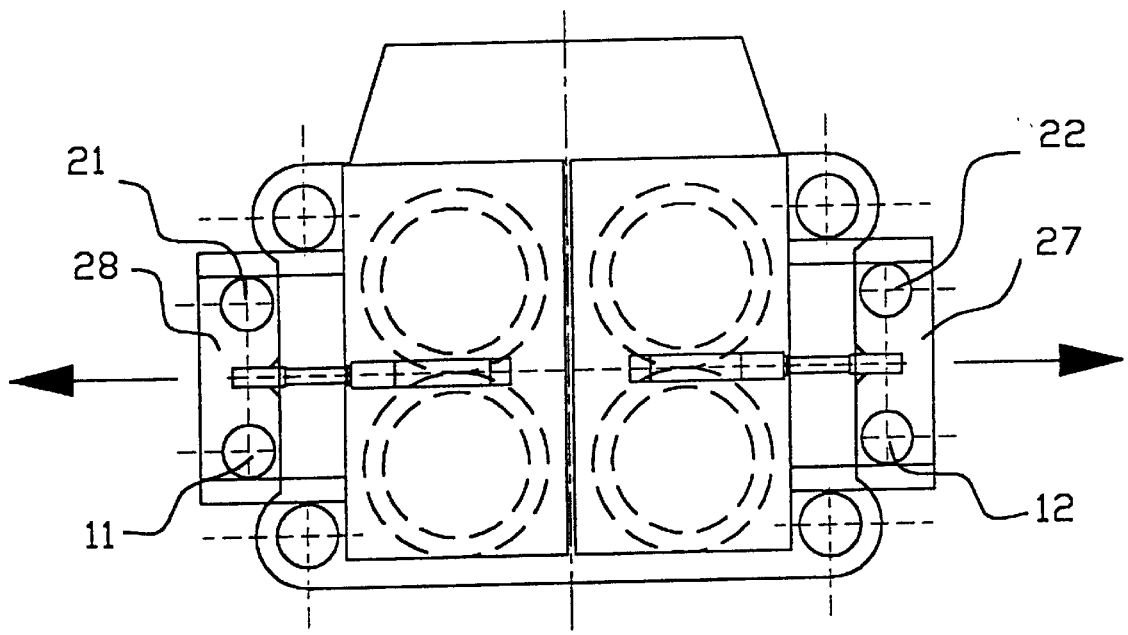
FIG. 5 is a ground view of the press in a second operating position.
Figure 6:
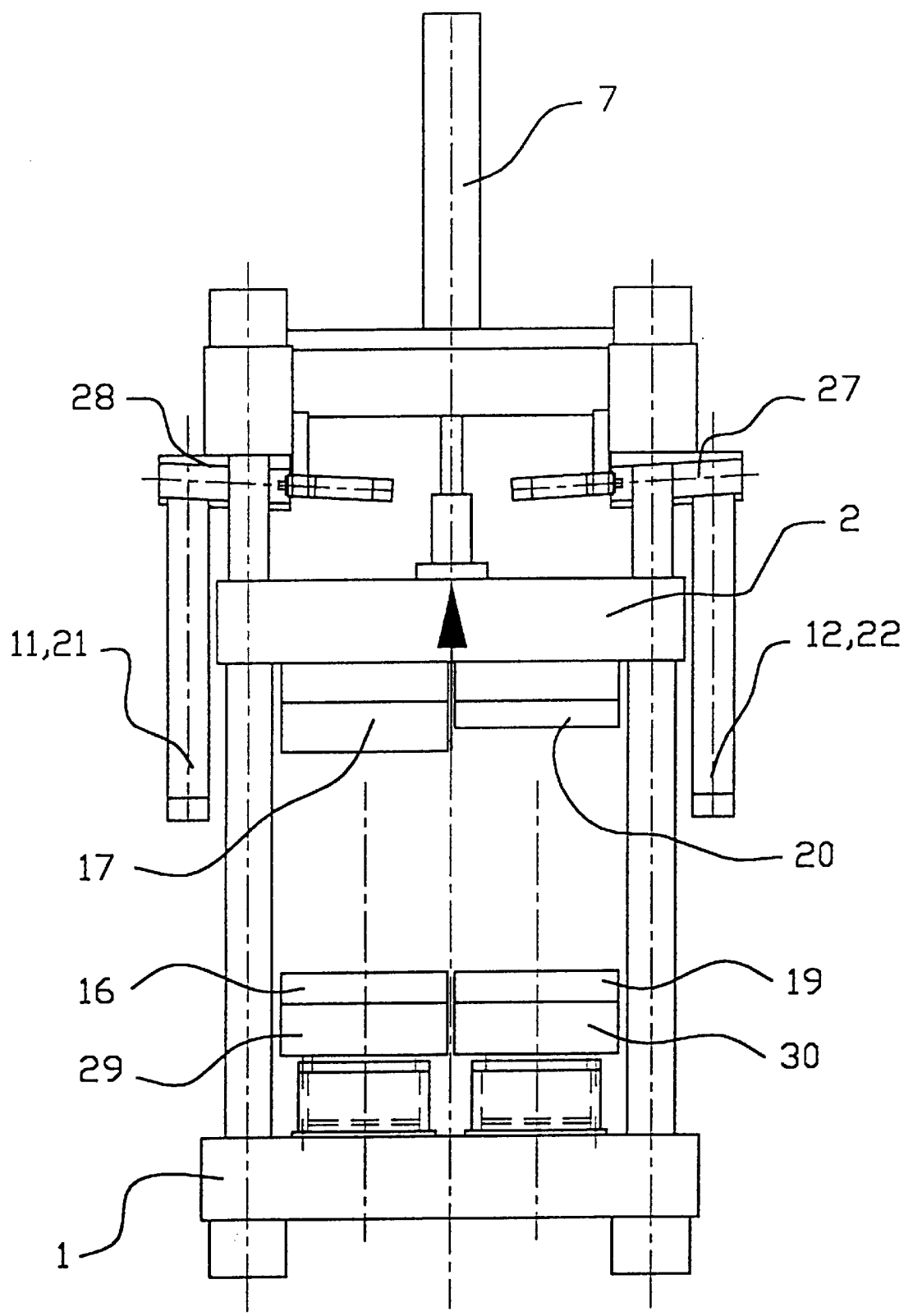
FIG. 6 is a front view of the same press shown in FIG. 1, in a third operating position.

The reference to the mentioned figures shows a directly controlled hydraulic press equipped with four columns or pillars 5, 25, 6, 26, comprising a fixed lower plate or support 1 and a mobile upper plate or support 2, actuated by an active piston 7 set above a lid 8. The fixed support 1 is capable of holding two or more half molds 16, 19 set side by side, while the mobile support 2, capable of approaching and spreading apart from said fixed support 1, is suitable for holding two or more half molds 17, 20 set side by side. A characteristic of the exemplified press is that at least one hydraulic power cylinder 13, 23 and 14, 24 is interposed between each first half mold 16, 19 and the fixed support 1, which allows to fine-tune the closing of the molds, thus compensating for any differences in height between the two molds 15, 18.

Another characteristic of the exemplified press is that it provides for devices 11, 21, 28;12, 22, 27, capable of impeding the reverse motion of the mobile support 2 during the closing of the molds 15, 18.

The devices 11, 21, 28; 12, 22, 27, which are capable of impeding the reverse motion of the mobile support during the closing of the molds 15, 18, preferentially include some pushing pins 11, 21 and 12, 22 which may be positioned between the mobile plate 2 and the frame of the press.

In the embodiment shown, the pushing pins 11, 21; 12, 22 are tied to two guides 27, 28 positioned under the lid 8 and actuated by appropriate hydraulic cylinders 9 and 10.

An expert in the trade will immediately grasp that said blocking system allows a quick opening of the molds, in addition to ensuring their safe closing.

The reader experienced in the trade will further grasp that this solution allows achieving a high closing force, at a modest expenditure of energy. The power cylinders 13, 23 and 14, 24 are in fact completing a very short stroke, barely enough to allow the entrance and exit of the pushing pins 11, 21; 12,22.

The guides 27 and 28 may advantageously be inclined, so as to impart the pins a inclined motion, which further helps to boost the molds' opening speed.

The expert in the trade may of course envision numerous variants of the embodiment thus described, all of which would however fall within the scope of protection established by the enclosed claims.

In the embodiment described above, the first half molds 16, 19 are attached to appropriate connecting plates 29, 30, actuated by the hydraulic cylinders 13, 23; 14, 24.

The plates 29 and 30 may alternatively be substituted by a single connecting plate, not shown, so as to allow mounting a mold of a size even double that of the molds 15 and 18. In particular the shape, sizes and type of materials may vary depending on the requirements.

What is claimed is:

1. A directly controlled hydraulic press with a molding equipment capable of holding at least two molds set side by side, comprising:

a fixed support;

two or more first half molds held by the fixed support and set side by side;

a mobile support having a lower surface and an upper surface and capable of movement toward and away from the fixed support;

two or more second half molds held by the upper surface of the mobile support and set side by side;

at least one power cylinder interposed between every first half mold and the fixed support, which allows to fine-tune the closing of the molds, thus compensating for any differences in the height of the two molds; and a plurality of devices for impeding reverse motion of the mobile support during the closing of the molds, each of the plurality of devices comprising a pair of pushing pins movable between two positions, a first position in which a free end of each pin is in contact with the upper surface of the mobile support to impede reverse motion of the mobile support and a second position in which the free end of each pin extends beyond the extremities of the upper surface of the mobile support;

wherein each of the plurality of devices further comprises guide means in which the end of each pushing pin opposite the free end is movably positioned, the guide means being inclined to the vertical to permit movement of the free ends of the pushing pins beyond the extremities of the upper surface of the mobile support.

2. The hydraulic press according to claim 1, wherein each of the plurality of devices futher comprises cylinder means for moving the ends of each pair of pushing pins opposite the free ends within the guide means.

3. The hydraulic press according to claim 1, further comprising removable connecting plates between the first half molds and the power cylinders.

* * * * *